United States Patent [19]

Ito et al.

[11] Patent Number: 4,493,635
[45] Date of Patent: Jan. 15, 1985

[54] OXYGEN-ENRICHED AIR RATIO CONTROL DEVICE FOR COMBUSTION APPARATUS

[75] Inventors: Hirosato Ito; Daizo Takada, both of Osaka, Japan

[73] Assignee: Osaka Gas Company Limited, Osaka, Japan

[21] Appl. No.: 465,679

[22] Filed: Feb. 10, 1983

[30] Foreign Application Priority Data

Feb. 27, 1982 [JP] Japan ............................ 57-27900[U]

[51] Int. Cl.³ ............................................. F23N 3/08
[52] U.S. Cl. ...................................... 431/90; 431/12; 431/80; 236/15 BD
[58] Field of Search ............... 431/4, 80, 12, 18, 89, 431/90, 75; 236/15 BD, 15 E; 110/186, 188, 189, 190; 123/344; 374/37; 364/500

[56] References Cited

U.S. PATENT DOCUMENTS

| | | | |
|---|---|---|---|
| 3,722,811 | 3/1973 | Osburn | 431/12 X |
| 3,905,745 | 9/1975 | Konda | 431/2 |
| 4,043,742 | 8/1977 | Egan et al. | 431/12 |
| 4,330,260 | 5/1982 | Jorgensen et al. | 431/12 |

FOREIGN PATENT DOCUMENTS

| | | | |
|---|---|---|---|
| 0140277 | 12/1978 | Japan | 110/188 |
| 2075718 | 11/1981 | United Kingdom | 431/12 |

*Primary Examiner*—Margaret A. Focarino
*Attorney, Agent, or Firm*—Wenderoth, Lind & Ponack

[57] ABSTRACT

A control device controls the air ratio in a combustion apparatus constructed so that combustion fuel supplied via a combustion fuel supplying pipe is burned with oxygen-enriched air obtained by drawing air through an oxygen permeable selective membrane by means of a vacuum pump provided at the downstream side of the oxygen permeable selective membrane and supplied via an air supplying pipe. The control device has an air flow meter and an oxygen concentration analyzer, both provided at the air supplying pipe, and a fuel flow meter provided at the combustion fuel supplying pipe. The air ratio is calculated from the values of the flow rate of of air, the oxygen concentration and flow rate of the combustion fuel. The amount of air drawn by the vacuum pump is controlled so that the actual air ratio is equal to an predetermined air ratio.

2 Claims, 1 Drawing Figure

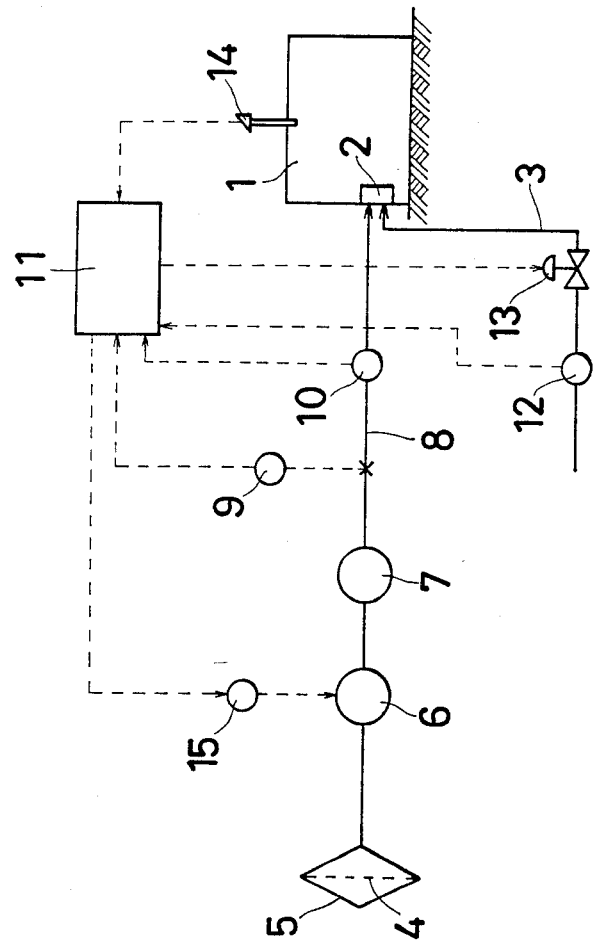

OXYGEN-ENRICHED AIR RATIO CONTROL DEVICE FOR COMBUSTION APPARATUS

BACKGROUND OF THE INVENTION

1. Field of the Invention

The present invention relates to a control device for a combustion apparatus, and more particularly, to a control device for controlling the ratio of oxygen-enriched air for use in combustion, obtained by passing air through an oxygen permeable selective membrane.

2. Description of the Prior Art

A combustion apparatus for the purpose of combustion of fuels at high temperature by employment of oxygen-enriched air obtained by means of an oxygen permeable selective membrane already is known. It is difficult to voluntarily control the air according to the load of combustion.

It is an object of the present invention to provide a control device for controlling the ratio of oxygen-enriched air for use in a combustion apparatus.

SUMMARY OF THE INVENTION

To accomplish the foregoing object, there is provided a control device to control the proportion or ratio of air to fuel for use in a combustion apparatus. The control device includes an air flow meter and an oxygen concentration analyzer, both provided at the air supplying pipe, and also includes a fuel flow meter provided at the combustion fuel supplying pipe. The control device is provided with means for calculating the actual air ratio from the flow rate of the air, the oxygen concentration and flow rate of the combustion fuel, and for controlling the amount of air supplied by the vacuum pump so that the actual air ratio is equal to a predetermined air ratio.

According to a preferred embodiment of the invention, the combustion fuel supplying pipe is provided with a control valve. The control means adjusts the opening of the control valve so that the combustion temperature detected by temperature detecting means is equal to a predetermined value. Since the vacuum pump is controlled so that the oxygen-enriched air ratio is equal to the predetermined value, the fuel is burned stably at a predetermined air ratio at all times.

BRIEF DESCRIPTION OF THE DRAWING

The single drawing FIGURE is a diagram of an example of an embodiment of the present invention.

DETAILED DESCRIPTION OF THE PREFERRED EMBODIMENT

The drawing schemmatically shows an example of an embodiment of the invention. Combustion fuel such as town gas is fed to a burner 2 mounted on a combustion furnace 1 via combustion fuel supplying pipe 3. Air for combustion, which is enriched with oxygen through an oxygen permeable selective membrane 4 of an oxygen-enriched air generating means 5, is fed to the burner 2 via air supplying pipe 8 equipped with a vacuum pump 6 and a blower 7. Since the combustion fuel is burned with the oxygen-enriched air, the fuel can be burned at a high temperature in the combustion furnace 1.

An oxygen concentration analyzer 9 and an air flow meter 10 are provided at the air supplying pipe 8, and values detected by the oxygen concentration analyzer 9 and the air flow meter 10 are input to a control means 11. The combustion fuel supplying pipe 3 is equipped with a fuel flow meter 12 and a control a valve 13, and value detected by the fuel flow meter 12 is input to the control means 11. Furthermore, the combustion furnace 1 is provided with a temperature detecting element 14, and the temperature in the combustion furnace 1 detected by the temperature detecting element 14 is supplied to the control means 11.

The control means 11 functions to calculate the amount of oxygen in the air supplied to the burner 2 based on the value detected by the oxygen concentration analyzer 9 and the air flow meter 10, and to calculate an air ratio according to the amount of calculated oxygen and to the value detected by the fuel flow meter 12. The air ratio is predetermined at the control means 11, and a signal from the control means 11 for varying the rates of rotation of the vacuum pump 6 is supplied to a controller 15 so that the calculated air ratio is almost equal to a predetermined air ratio. The control means 11 also adjusts the opening of the control valve 13 in order that the temperature detected by the temperature detecting element 14 is equal to a predetermined temperature.

Thus, the combustion rate of the burner 2 is controlled in order that the temperature in the combustion furnace 1 will be equal to the predetermined temperature. Moreover, the air ratio is automatically controlled by means of the control means 11 so as to vary the rates of rotation of the vacuum pump 6.

The temperature detecting element 14 may be omitted.

What is claimed is:

1. In a combustion apparatus of the type including a burner for burning combustion fuel and oxygen-enriched air, a fuel supply pipe for supplying combustion fuel to said burner, oxygen-enriched air generating means including an oxygen permeable selective membrane, an air supply pipe extending from said generating means to said burner, and a vacuum pump in said air supply pipe at a location downstream of said generating means for drawing air through said membrane, thereby enriching said air with oxygen, and supplying said air to said burner, the improvement of means for controlling the air-fuel ratio supplied to said burner, said controlling means comprising:

air flow meter means at said air supply pipe for determining the amount of air passing therethrough and for generating a signal representative thereof;

oxygen concentration analyzer means at said air supply pipe for determining the concentration of oxygen in said air passing therethrough and for generating a signal representative thereof;

fuel flow meter means at said fuel supply pipe for determining the amount of fuel passing therethrough and for generating a signal representative thereof; and means, responsive to said signals from said air flow meter means, said oxygen concentration analyzer means and said fuel flow meter means, for calculating the actual air-fuel ratio supplied to said burner, and operatively connected to said vacuum pump for controlling the operation thereof to adjust said actual air-fuel ratio to equal a predetermined air-fuel ratio.

2. The improvement claimed in claim 1, further comprising a control valve in said fuel supply pipe, and temperature detecting means for detecting the combustion temperature of said burner and for generating a signal representative thereof, and wherein said calculating and controlling means is responsive to said signal from said temperature detecting means and operatively connected to said control valve to regulate the opening thereof to adjust said combustion temperature to equal a predetermined value.

* * * * *